United States Patent [19]

Kipnees et al.

[11] Patent Number: 5,035,078
[45] Date of Patent: Jul. 30, 1991

[54] TREE PROTECTION AND TRANSPARENT WRAPPING

[75] Inventors: Jerome J. Kipnees, Cranbury, N.J.; Lewis R. Raszewski, Stevensville, Md.

[73] Assignee: The Crowell Corporation, Newport, Del.

[21] Appl. No.: 317,822

[22] Filed: Mar. 1, 1989

[51] Int. Cl.$^5$ .............................................. A01G 17/12
[52] U.S. Cl. ............................................ 47/24; 47/58
[58] Field of Search ................... 47/23, 24, 25, 2, 8, 47/58

[56] References Cited

U.S. PATENT DOCUMENTS

| | | | |
|---|---|---|---|
| 560,966 | 5/1896 | Brown | 47/23 |
| 1,941,431 | 12/1933 | Case | 47/8 |
| 2,947,111 | 8/1960 | Zobrist | 47/57.5 X |
| 3,333,361 | 8/1967 | Manak | 47/23 X |
| 3,890,740 | 6/1975 | Miller | 47/2 X |
| 4,341,039 | 7/1982 | Reese | 47/23 X |
| 4,901,472 | 2/1990 | Donohue | 47/22 X |

FOREIGN PATENT DOCUMENTS 8803361 5/1988 PCT Int'l Appl. ....................... 47/2

OTHER PUBLICATIONS

*The Use of Insulating Wraps for Protection of Citrus Trees from Freeze Damge*, R. A. Hensz Proceedings First International Citrus Symposium, vol. 2, 1969.

Primary Examiner—Henry E. Raduazo
Attorney, Agent, or Firm—Connolly and Hutz

[57] ABSTRACT

Citrus tree is protected against freeze damage by wrap that keeps moisture from wrapped surface of tree. Wrap can be transparent to permit inspection and transparent wrap can also be used for packaging other products such as electrical components, particularly those sensitive to static charge build-up.

2 Claims, 5 Drawing Sheets

FIG. 5
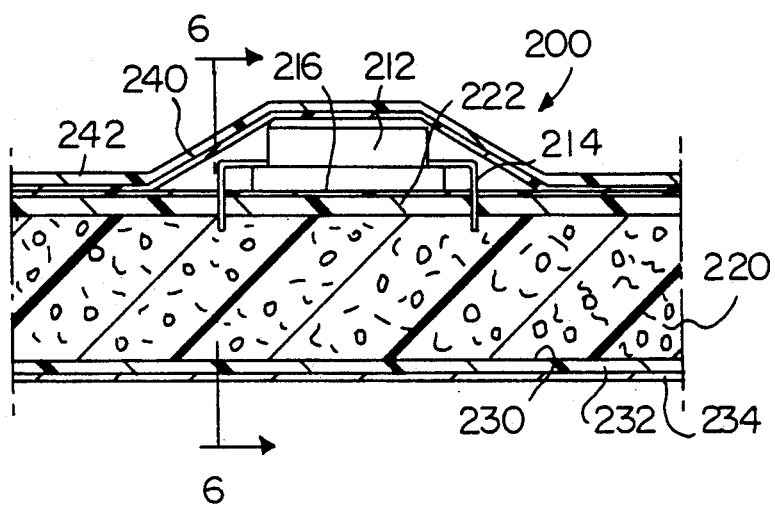
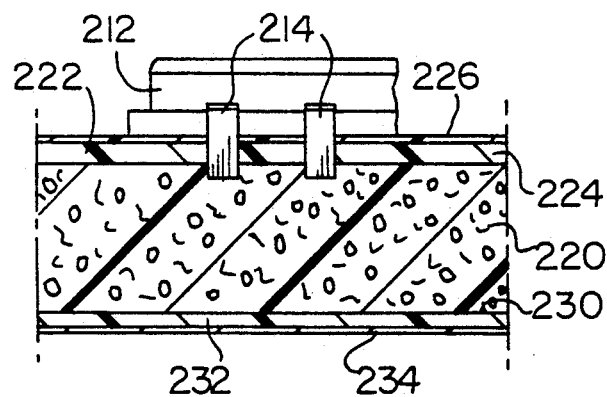
FIG. 6

TREE PROTECTION AND TRANSPARENT WRAPPING

The present invention relates to the protection of trees and other articles.

Among the objects of the present invention is the provision of novel freeze protection devices and techniques.

Additional objects include protective coverings that are transparent.

The foregoing as well as additional objects of the present invention will be more fully understood from the following description of several of its exemplifications, references being made to the accompanying drawings in which:

FIG. 5 is a vertical sectional view of a protective packaging that includes a transparent covering; and FIG. 6 is a sectional view of the packaging of FIG. 5, taken along line 6—6.

According to the present invention a young tree is protected by encircling the low-temperature-sensitive portion of the tree trunk with a thermally insulating plastic foam coat about 40 centimeters tall and at least about six centimeters thick, the coat blocking the passage of thermal radiation, and keeping or treated to keep, rain from getting into the coat or between the coat and the trunk.

The foam is preferably very cushiony and is compressed at least about 10% in thickness. It can have a yieldability of 0.5 to 0.7 pounds per square inch at 25% compression. An open-cell construction for the foam provides much more yieldable cushioning, but requires a waterproof overwrap or under-wrap to keep liquid water from the tree.

Young citrus trees in the southern United States, for example, are notoriously subject to freeze damage by winter cold waves, and various protective techniques have been used. However, in some geographic locations or with some types of trees special protection techniques are needed.

Figure 1:
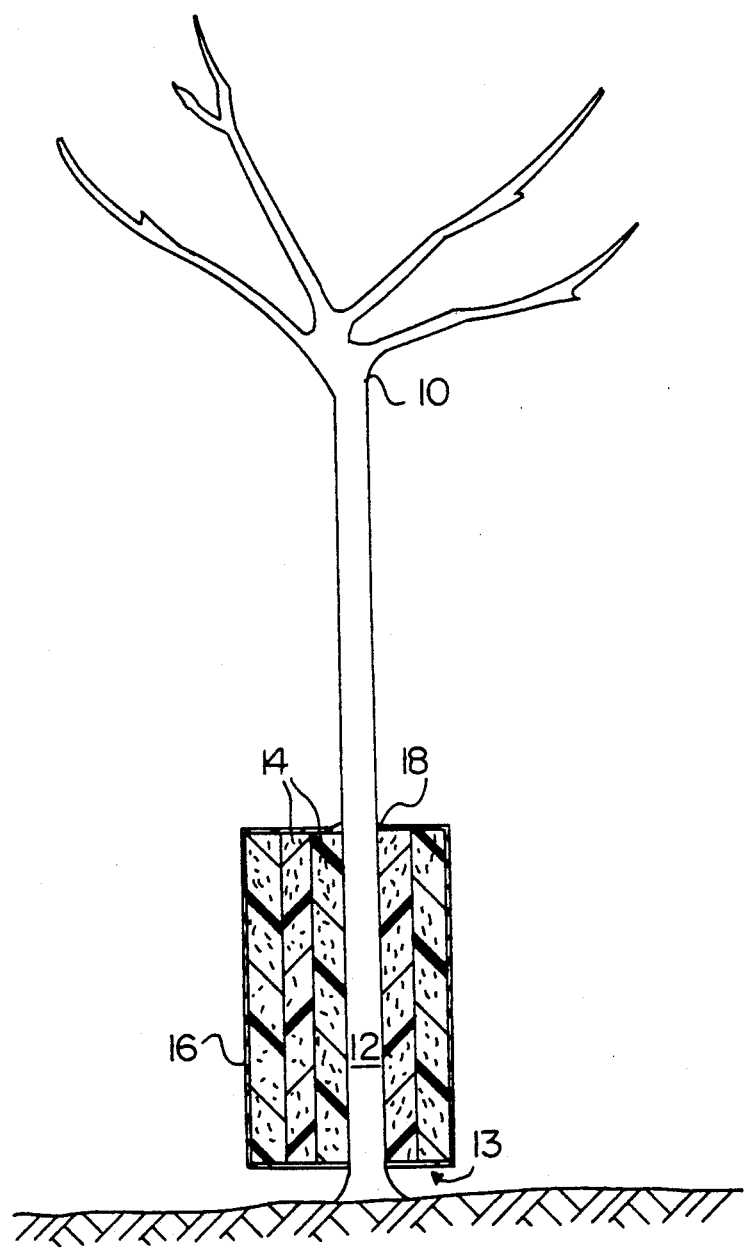
FIG. 1 is a vertical section of a protected tree representative of the present invention.

Referring now to FIG. 1, an orange tree 10 seven months old is there shown with the lower portion 12 of its trunk wrapped in a coat 13 consisting of several turns 14 of cushiony plastic foam held in place by an over-wrap 16. The over-wrap is a very thin film of readily stretchable waterproof plastic that is drawn up over the top of the principal wrap to press snugly against the tree trunk, as illustrated at 18, to keep rain from getting into the wrap or between the wrap and the tree trunk.

Figure 2:
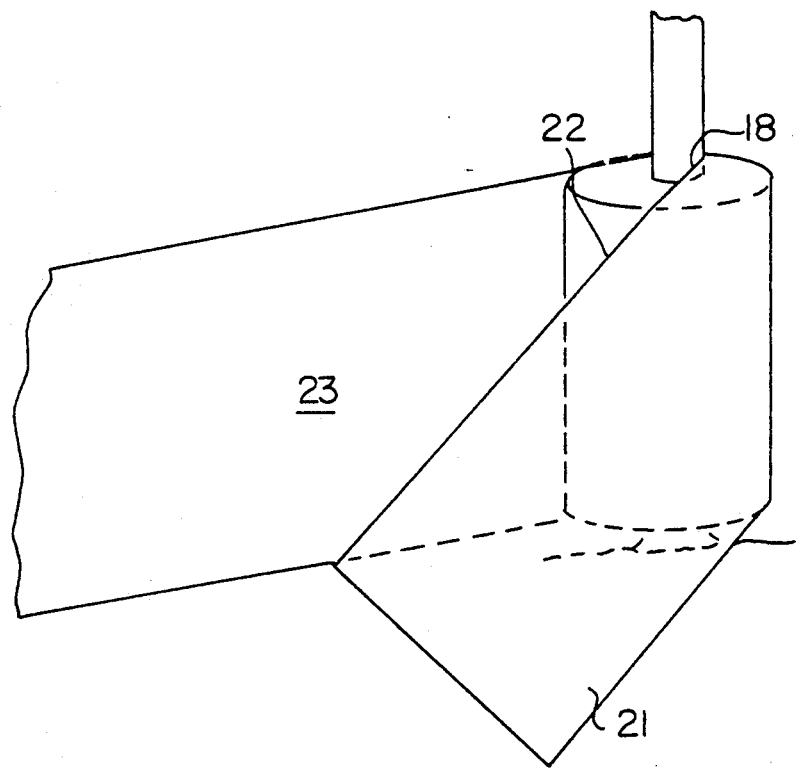
FIGS. 2, 3 and 4 are explanatory perspective views showing steps in the preparation of the assembly of FIG. 1.
Figure 3:
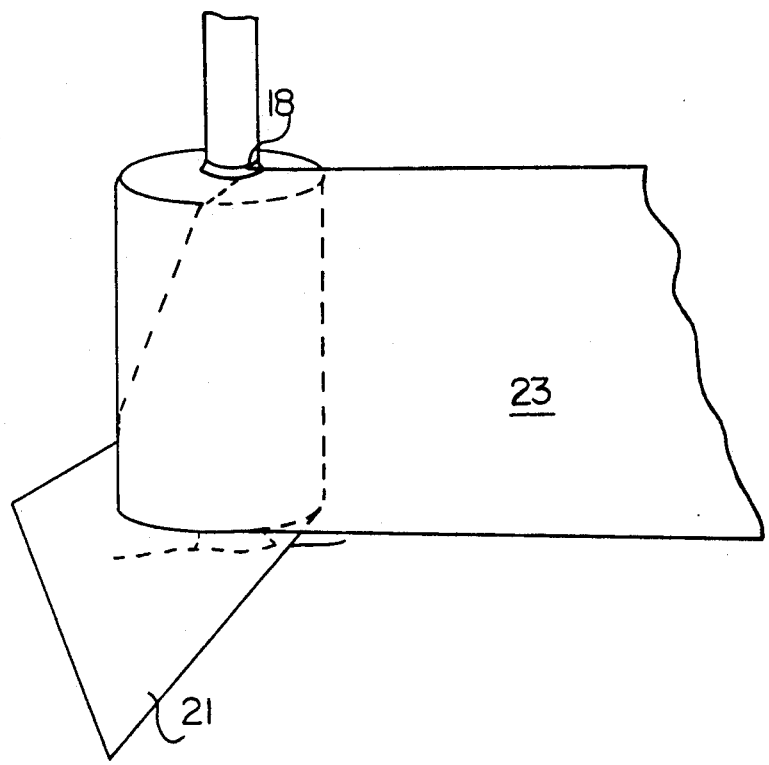
Figure 4:
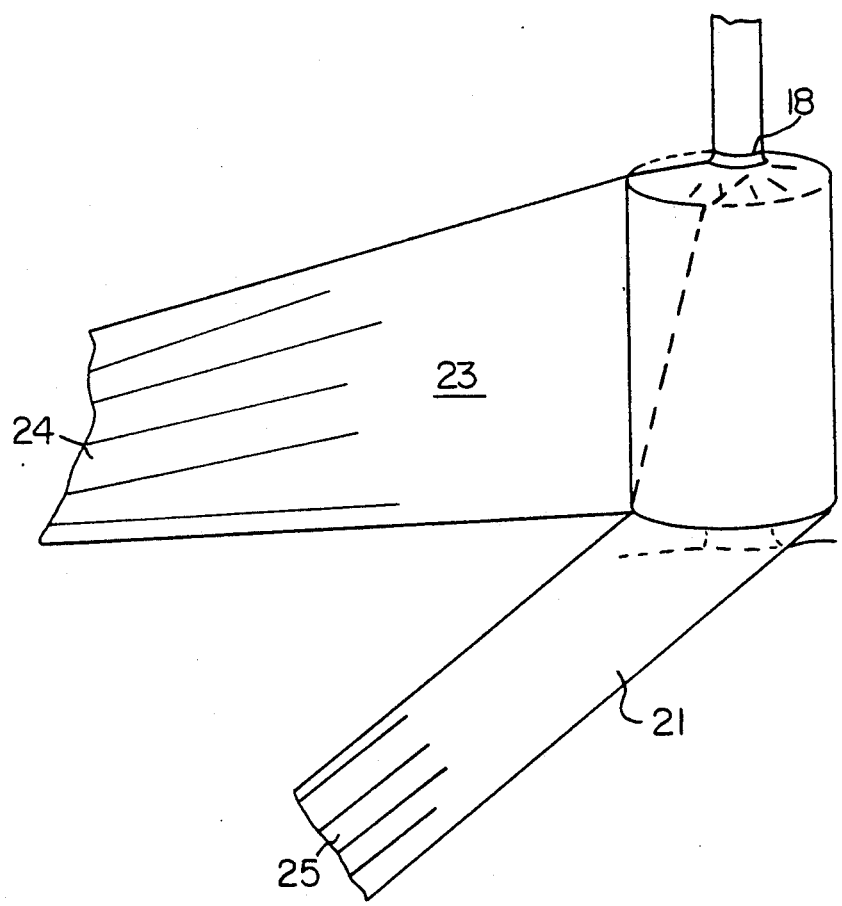

FIGS. 2, 3 and 4 show how the over-wrap is applied. One end 21 of a length of over-wrap film, which is a little wider than the height of coat 13, is placed against the side of the coat with the upper edge 22 of the film extending above the top of the coat by about 5 centimeters. The remaining length 23 of the over-wrap is then stretched and wrapped, the stretching being sufficient to carry edge 22 against the tree trunk 12 as shown at 18. FIG. 2 shows the over-wrap about ¾ turn around the coat.

Further wrapping brings the length 23 over the end 21, as illustrated in FIG. 3, the stretching being continued to keep edge 22 encircling snugly against the trunk.

Still further stretched wrapping brings the length 23 about 1⅜ turns around the trunk, as illustrated in FIG. 4. The length 23 can then be cut or torn from the balance of the over-wrap supply, leaving enough over-wrap so that it can be gathered as at 24 and tied to end 21 which is also gathered as at 25. In the tying, ends 24 and 25 are subjected to additional stretching to further assure the snug trunk contact at 18.

The foam coat is preferably at least about 6 centimeters thick and about two or three turns of a cushiony plastic foam sheet about 2 to about 3 centimeters thick. The cushiony character of the foam sheet is such that it will squeeze into and fill the space at the beginning of the first turn of the wrap, where the second turn of the foam sheet climbs from the tree trunk to the outer face of the first turn. This feature is described and illustrated in parent Ser. No. 931,215.

Open-celled foams are generally more cushiony than closed-cell foams, and open-celled polyurethane foams can be particularly cushiony, so much so that they are used as expendable mattress tops in hospitals and will compress to practically no thickness under the weight of a patient. However, foams of natural rubber can also be very cushiony even when of closed-cell nature. The mattress tops have an egg-crate face, as described in application Ser. No. 157,272 filed Feb. 17, 1988, and foam sheets with such a face can be used for the present invention. Such sheets also contribute extra air cells when compressed, and help the thermal insulation.

In the interests of effectiveness and economy, open-cell polyurethane is preferred, and is treated as by the foregoing over-wrap to keep rain from getting into the foam cells or between the foam and the tree trunk. Also the foam layers are preferably squeezed to compress their thickness by at least about 10% as they are wound around the tree trunk, to make better contact with and closely follow the surface wrinkles of the trunk. The over-wrap is preferably highly plasticized stretchable polymeric vinylidene chloride or polymeric vinyl chloride film about 10 to about 15 microns thick, such as used in households to cover and cling to the sides of food containers.

The over-wrap film should also contain ingredients that protect it from the deteriorating effects of the weather, and also protect the coat underneath it. A high concentration of ultra-violet light absorber, as well as anti-oxidant is generally adequate.

Where a closed cell foam coat is used, the foam itself can be loaded with anti-weathering ingredients and an over-wrap would not be necessary. The foam sheet can be laminated to a thin backing support such as polyethylene film as in parent Ser. No. 931,215, in which event the anti-weathering ingredients can be incorporated in the support. Instead of laminating to a backing support, the foam sheet can be held in a thin-walled tube of yieldable material such as polyethylene film with a wall thickness less than about 50 microns. The tube can be a tight fit, so that the foam sheet is inserted in somewhat compressed condition, or the tube can be a loose fit. In either case, the filled tube wraps very readily and does a good job of excluding rain. The tube wall can be untensilized or tensilized polyethylene or a pair of cross-tensilized films, or any other type of plastic including the easily stretched plastic described above.

Only about 40 centimeters of trunk height need freeze protection, even after the tree grows quite tall, so that the plastic foam sheet need be no wider.

A closed-cell foam coat is desirably pre-molded in the shape of a cylinder having an internal diameter of about 15 millimeters and an outer diameter of about 75 to 80 millimeters. A continuous pipe-like length of such material can be extruded or molded and then cut into individual cylinders about 40 centimeters tall. Each cylinder can then have its side wall slit through so that it can be opened up a little to permit the cylinder to be fitted around a tree trunk. The molded foam can be sufficiently elastic for its wall to then close around the trunk, but a simple tie wrap can encircle the coat and hold its cut wall faces together, or a little quick-setting adhesive can be applied to one or both faces and permitted to set while the faces are held in contact with each other. An inexpensive water-excluding foam such as polyethylene, polypropylene, polystyrene and polyvinylchloride is quite suitable for such a coat.

Alternatively the foam coat can be extruded or molded as a continuous length having an arcuate configuration about a transversely directed axis, so that a cut length will readily wrap around a tree trunk.

A feature of the foregoing is that the coat of the present invention keeps moisture from accumulating or remaining in contact with the protected portion of the tree trunk. Accordingly fungus and other infections that can readily take place in some climates, as in lower Florida, will be largely prevented. To help assure such infection control, other anti-infective agents can be incorporated in the coat and/or in the over-wrap. The lower surface of the coat need not be protected, as will be noted from FIG. 1, and leaving it unprotected permits the escape of moisture that may condense in the foam cells due to weather changes for example.

Instead of a protective coat in the form of a wrap, it can be sprayed on as by a spray of polyurethane-forming reactants that condense to resin and foam up as the spray is exposed to air. The resulting resin foam also adheres very well to a tree trunk, and can be built up to almost any thickness. The sprayed-on material generally close in a few minutes to a foam having a skin that is sufficiently adherent, hydrophobic and closed-cell to keep rain out. However, it can be over-wrapped for greater assurance.

Where it is desired that the tree trunk be kept out of contact with chemicals present in the spray, the trunk can be pre-wrapped with a few turns of the thin stretchy plastic film 16. Such film is best stretched as it is wrapped, and then relaxed, so that it more closely conforms to and fills in the wrinkles in the trunk surface. After such film is applied, it can also be pressed against the trunk, with one's fingers for instance, to even more closely conform. The foam sheet or foam spray can then be applied around such under-wrap.

The growth of a protected tree will increase its trunk girth, and compress the protective coat. Where the coat is sprayed on and not sufficiently yieldable, it may tend to crack under such compression, and an over-wrap will then help protect against ingress of rain. A transparent over-wrap, such as of the stretchy plastic film, is desirable in that it will permit simple inspection to show whether water has found its way under it or fungal or other growth has occurred there. The same advantages are obtained when a transparent wrap is applied directly to the tree.

FIG. 5 is taken from parent U.S. Pat. No. 4,790,433 where it shows a protective packaging for an integrated circuit having a number of connector lead projecting in the same direction. The package has a layer of electrically conductive crisp plastic foam about 5 to about 8 millimeters thick, an anti-stat cohesive-nonadhesive coating on a first face of the foam layer, a metallized polyethylene terephthalate film about 25 microns thick laminated to the opposite face of the foam, an antistat coating on the outer face of the film, the integrated circuit being mounted on a central portion of said first foam face with said leads penetrating through that face into the foam, the integrated circuit being covered by a second metallized polyethylene terephthalate film that has one of its faces coated with an antistat cohesive-nonadhesive layer and has that face adhered to the antistat cohesive-nonadhesive layer on the foam around the integrated circuit.

The foam can be made electrically conductive by loading with finely divided carbon the resin from which it is formed. An electrical conductivity of about 1 to about 5 ohms per square is very effective.

The metallizing of the polyethylene terephthalate can be sufficiently heavy to reflect at least 40% of incident light. The polyethylene terephthalate film covering the integrated circuit can be more heavily metallized to reflect at least about 98% of incident light.

FIG. 5 shows a package 200 having a multipin integrated circuit 212, with its pins 214 all projecting in the same direction—in this case downwardly. Such a pin arrangement is standard, with most integrated circuits having two rows of pins, and from about 3 to about 50 pins in each row. Each pin is generally flat sheet metal about 1 millimeter wide when viewed as in FIG. 6, and about $\frac{1}{3}$ millimeter thick. They project downwardly about 3 to about 7 millimeters below the bottom plane 216 of the integrated circuit.

Each of the pins 214 is embedded in a layer 220 of electrically conductive foam. The foam is a crisp one and not too cushiony, so that the mere pushing of the integrated circuit against the face 222 of the foam will cause the pins to cut their way into the illustrated position. The foam is preferably of open-cell construction with an electrical conductivity of about 4 ohms per square and is available as a commercial product that has essentially no cushiony resilience and a density of about $\frac{1}{3}$ gram per cubic centimeter.

Before the integrated circuit is pushed into place, the foam face 222 is coated with a primer layer 224 applied as a high viscosity composition, and after layer 224 is dried, an anti-stat cohesive-nonadhesive coating 226. Primer layer 224, of an acrylic resin thickener in aqueous solution for example, sets to bridge across the open cells at foam face 222 and thus keeps layer 226 from penetrating too deeply into the foam. Layer 226 is preferably the composition of Example 3 in WO 87/01092, and after drying has a coating weight of about 1 to about 10 grams per square decimeter. It also shows a static discharge time of about 0.2 seconds.

The lower face 230 of foam layer 220 has laminated to it a film 232 of polyethylene terephthalate about 25 microns thick carrying a metallized coating 234. The polyurethane can be cast against the film 232, or the film can be applied to pre-formed foam with a laminant such as hot melt pressure-sensitive adhesive. Several of such adhesives are disclosed in the PCT APPLICATION. Other good laminants are hydrocarbon resins such as modified or unmodified rosin, preferably mixed with up to $\frac{1}{3}$ of its weight with amorphous polypropylene. Amorphous poly alpha olefins in general are satisfactory. The metallized layer can also be covered with an anti-stat layer such as that disclosed supra.

Film 232, although exceedingly thin, securely supports the foam which is not very thick, and keeps it from being torn apart or significantly damaged in handling.

Another film 240 of polyethylene terephthalate covers the integrated circuit 212 and is adhered to the cohesive-nonadhesive layer 226. To this end film 240 has its under surface also coated with a cohesive-nonadhesive layer 242. Either or both faces of film 240 can be metallized but the metallizing can be omitted if transparency is needed to read legends on the top of the integrated circuit. The cohesive-nonadhesive layer can then be given anti-stat characteristics as by use of the additives described in WO 87/01092 or the small concentration of conductive fibers described in parent Ser. No. 142,075. Either technique leaves film 240 adequately transparent, inasmuch as the cohesive-nonadhesive layer is quite transparent when no more than about 500 microns thick. The conductive fiber layer can alternatively be coated on the outer face of film 240, so as to follow the transparent shielding combination of U.S. Pat. No. 4,156,751.

The foregoing small concentration of conductive fibers has graphite or metal-plated graphite fibers about 10 to about 20 microns thick and about 3 to about 5 millimeters long dispersed in a transparent resin binder such as an acrylate resin, in a concentration as low as about ½ to about 1% fiber by weight of the solid binder. Such a dispersion can be liquefied by the addition of a binder solvent like methyl chloroform or methylethyl ketone and applied as a fiber-containing liquid film which is then dried, or can be melted and applied by a hot melt roller coating. Nickel is reported as a preferred metal plating on the graphite, but can be made into fibers without the graphite, and used in graphite-free form. Fibers shorter than about 3 millimeters should be in concentration higher than 1%.

The integrated circuit packaged as in FIG. 5, is exceedingly secure. The pins are essentially short-circuited to each other so that no significant voltages can be developed at the pin circuits. The anti-stat layers keep electrical fields from being developed internally in the integrated circuit.

A block of foam packaging about 10 centimeters square will be more than adequate to hold even the largest integrated circuit. In general there should be a margin of at least about 15 millimeters wide around the integrated circuit to allow for secure adhesion of the covering film 140.

Instead of foam layer 220 being polyurethane, it can be polystyrene and instead of being coated with carbon particles, it can have organic anti-stat distributed through it as in U.S. Pat. No. 4,608,394.

Polyethylene makes a very inexpensive foam for general use, and when corona-treated laminates well to paper or other supporting backers with amorphous poly alpha olefins that are blended with about 1/5 their weight of rosin type adhesives.

Such a laminate of polyethylene to polyethylene terephthalate can be used in place of the corresponding laminate of FIGS. 5 and 6, without loading the polyethylene with electrically conductive particles. Protection against electric fields is provided by the anti-stat characteristics of the layers containing anti-stat.

If desired, the foam face 222 can be painted with an electrically conductive paint such as those containing a suspension of silver particles in high concentration. This paint can be applied before the cohesive-nonadhesive coating 226, or if applied over the cohesive-nonadhesive coating, can be applied to only the central portion of the foam.

An integrated circuit that also contains one or more additional leads pointed in a direction different from that of leads 214, can have a second piece of crisp foam applied so that it is penetrated by and held against the additional leads. The covering film 240 can then cover the second piece of foam as well as the integrated circuit.

While the foregoing lead configurations are used with integrated circuits, other types of electrical devices have circuits which are not entirely of the integrated circuit type. These can also be packaged the same way.

The package of FIGS. 5 and 6 can be made simpler to open, as by inserting a tear tab between covering film 240 and the top of coating 226, with the tab projecting from the package so that it can be grasped and pulled to lift film 240 away from that coating. Alternatively, coating 226 and/or 242 can be interrupted along one or more corners or edges of the package to provide an easily grasped flap about 1 to about 1½ centimeters deep that remains unadhered so that the package is readily opened by pulling that tab back over the package. Coating 226 and/or 242 can be made less aggressive as coherents, as by incorporating 5 to 10% powdered clay in the cohesive-nonadhesive, or applying the cohesive-nonadhesive in spaced spots, to also make opening easier.

A still further alternative is to apply a little cohesive-nonadhesive onto the outer face of the top of the package, so that this top application, which can be on a relatively small area, can be gripped by a cohesive-nonadhesive-coated opening tool to pull the top off the package.

Obviously many modifications and variations of the present invention are possible in the light of the above teachings. It is therefore to be understood that within the scope of the appended claims the invention may be practiced otherwise than as specifically described.

We claim:

1. In the method of protecting young citrus trees against low temperatures, the step of encircling the low-temperature-sensitive portion of the tree trunk with a thermally insulative plastic foam coat about 40 centimeters tall and at least about six centimeters thick, the coat blocking the passage of thermal radiation, and keeping or treated to keep, rain from getting into the coat or between the coat and the trunk, the foam being cushiony with a yieldability of 0.5 to 0.7 pounds per square inch at 25% compression, and is compressed at least about 10% in thickness and between the coat and the tree trunk, the trunk is wrapped with at least one waterproof turn of a very thin plastic film that conforms to the surface irregularities of the trunk and keeps liquid water from getting to its wrapped portion.

2. In the method of protecting young citrus trees against low temperature, the steps of encircling the low-temperature-sensitive portion of the tree trunk with
   (A) at least two turns of a cushiony thermally insulating rain-repellent highly compressible plastic foam coat about 40 centimeters tall and at least about six centimeters thick, the coat blocking the passage of thermal radiation, and compressing the encircling coat at least about 10% in thickness so that the beginning of the second turn fills the gap needed to climb over the first turn, and
   (B) at least one stretched waterproof turn of a very thin stretchable clinging plastic film that clings and conforms to the surface irregularities of whatever it is wrapped over so that it keeps liquid water from getting to that wrapped portion.

* * * * *